Patented June 19, 1945

2,378,831

UNITED STATES PATENT OFFICE 2,378,831

PRIMARY AROMATIC AMINE FORMALDEHYDE RESINS AND COMPOSITIONS AND METHODS OF MAKING THE SAME

Loring Coes, Jr., Brookfield, Mass., assignor to Norton Company, Worcester, Mass., a corporation of Massachusetts No Drawing. Application July 23, 1942,
Serial No. 452,089

7 Claims. (Cl. 260—72)

This invention relates to resins and more particularly to the polymerized condensation product of a primary aromatic amine with formaldehyde.

One object of the invention is to provide a reagent which hardens or converts to an infusible condition a primary aromatic amine formaldehyde resin and particularly an aniline formaldehyde resin.

Another object is to provide an agent which not only hardens such resins but will also serve as a wettant for granular material bonded by the resin and as a plasticizer for the green mixture of grains and resin prior to the heat hardening stage.

Another object of the invention is to provide a hardening agent for such resins which during the heat conversion stage will not react to form water and cause distortion of the resin body.

Another object of the invention is to provide a method of making a final resin product, or an intermediate product capable of producing the same, whereby a primary aromatic amine formaldehyde resin may be materially hardened.

Another object is to provide a method of this type wherein a resin or a mixture of the resin with granular material to be bonded thereby may be cold-molded and the molded object thereafter heat cured while not confined under pressure.

Another object is to provide a method of making molded objects, with or without granular material, with the aid of an agent serving as a wettant and a plasticizer for a primary aromatic amine formaldehyde resin prior to heat hardening and which ultimately acts as a hardening and cross-linking agent for the resin without producing water during the hardening stage or causing distortion of the formed body. Other objects will be in part obvious or in part pointed out hereinafter.

The invention accordingly consists in the compositions and products, and in the several steps and relation and order of each of said steps to one or more of the others thereof, all as will be illustratively described herein, and the scope of the application of which will be indicated in the following claims.

My invention consists in the use of the chloracetates of the glycerol dichlorhydrins as alkylating and cross-linking agents or hardening agents for the primary aromatic amine formaldehye resins; and these agents may be used with or without other halogenated alkylating compounds, with or without fillers, and with or without the use of supplemental wettant plasticizers, such as furfural. I have found that these chloracetates can be used as wettants for granular material, such as abrasive grains, bonded by this type of resin and that they will serve as a plasticizer for the green mixture of granular material and resin prior to the heat hardening stage; but the esters serve primarily as cross-linking agents that harden the resin when the mixture is subjected to heat.

I provide a quantity of primary aromatic amine, such as aniline, ortho, meta or para toluidine, or diamino diphenyl methane; and a quantity of formaldehyde. I may optionally provide, to supplement the above-mentioned chloracetate a quantity of one or more organic compounds containing a halogen selected from the group consisting of chlorine, bromine and iodine and capable of splitting off hydrogen halide at elevated temperatures and/or of alkylating an aromatic amine polymer, providing cross links connecting amine groups of the chains. The aromatic amine which I now prefer to use is aniline. Aniline

or one of the other aromatic amines mentioned, or mixtures of two or more of such amines, is reacted with formaldehyde HCHO in the presence of a strong acid to produce a long chain polymer which, when an excess of formaldehyde above the stoichiometric proportions is used, for example, 20% excess, has adjacent chains connected with methylene —CH$_2$— groups to form a tough, heat resistant, semi-thermoplastic resin. I may add some of the formaldehyde after the initial condensation, in the form of paraformaldehyde, or by the addition of hexa-methylene-tetramine.

As examples of the supplemental halogenated organic compound, I may use any of polyvinyl chloride, polyvinylidene dichloride, rubber hydrochloride, chlorinated rubber, chlorinated polyisobutylene; any chlorine, bromine or iodine substituted paraffine hydrocarbon, such as hexa chlor ethane, tetra chlor pentane, 1, 2, diiodo ethane, beta butylene bromide, partly chlorinated eicosane, or any aliphatic halohydrin of not more than six carbon atoms, such as any of the amylene chlorhydrins; propylene chlorhydrin; any of the butylene chlorhydrins; ethylene chlorhydrin, ethylene bromhydrin, or glycerol alpha gamma diclorhydrin. Naturally enough, most of the examples are chlorinated compounds because these are cheaper and more readily available than the brominated or iodated compounds, but the latter two give effecitve results. The fluorinated compounds are rejected because they are too stable and will not alkylate the polymer. However, so far as the broad features of this invention are concerned, and apart from the esters hereinafter described, the halogenated organic compound may be omitted altogether.

Since one use of the resins of the invention relates to grinding wheels and other solid abrasive compositions and articles, I provide a quantity of abrasive grain. Any abrasive grain may be used, for example, any of the varieties of alumina, such as emery, corundum, dense "regular" fused alumina, porous white fused alumina; silicon carbide and other hard carbides; quartz; glass; garnet; or diamonds. Two or more of these abrasives may be mixed, if desired.

Manufacturers usually prefer to use the dry granular mix method, with the cold press and the oven to make organic bonded grinding wheels because this combination of steps and features is the cheapest to carry out and furthermore, generally gives uniform results. In the dry granular mix method the abrasive grains are placed in a mixing pan and are then wet with a suitable liquid; then powdered fusible resin is added, mixing is done to coat each granule with some of the powder and to leave a minimum of loose powder, then a mold is charged with the "dry granular mix" thus produced, the top plate is inserted, the mold is "closed" by means of an hydraulic press, the mold is then "stripped," the "green" wheel is taken to an oven and (at the same time as hundreds or thousands of others of varying sizes, shapes and compositions) it is cured to make the final composition and, after "truing" or "shaving," the final article. This method, in contradistinction to the use of the hot press with or without the autoclave and vice versa, has the advantage that ordinary ovens, in which thousands of "green" wheels can be stacked, are used; the hydraulic press is tied up by a given wheel for thirty seconds instead of thirty minutes, and the press need have no heated platens. This wetting of the abrasive grains by a liquid is called "plasticizing." It is preferred that the wettant be a solvent for the resin.

In the commercial manufacture of aniline-formaldehyde resin bonded grinding wheels and other solid abrasive products, only furfural has been used as this plasticizer-wettant. (Other aromatic-amine-aldehyde polymers have not been used commercially for the manufacture of grinding wheels and other solid abrasive products so far as I am aware). The furfural cross links the polymer and, therefore, converts it to the "infusible" condition. A stoichiometric quantity of aniline and formaldehyde condensed in the presence of a strong acid is believed to produce a resin which is structurally represented thus:

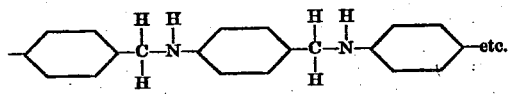

Such a resin cross-linked with furfural is believed to be represented thus:

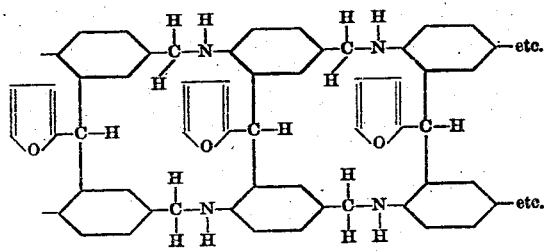

In accordance with my invention, the chloracetates of glycerol dichlorhydrins may be used as alkylating and cross-linking agents for the primary aromatic amine formaldehyde resins. A preferred and illustrative method of carrying out my invention may be as follows: I first prepare the chloracetate. For example, I may start with glycerol αγ dichlorhydrin and glycerol αβ dichlorhydrin, which are respectively, or may be written thus:

and

Mixtures of the above form chloracetates when reacted with chloracetic acid; such chloracetates are, respectively, or may be writen thus:

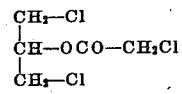

and

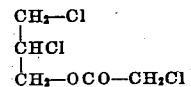

These are esters and the mixture alkylates and cross-links, I believe, the aniline-formaldehyde, thus:

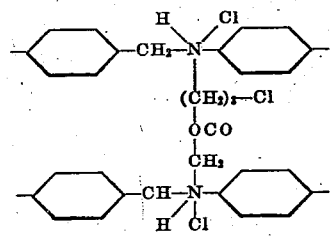

It will be noted that chlorine now appears in the amino group. When a grinding wheel according to the invention is used to grind, the heat generated by grinding (which may reach 500° C. or more and is a higher heat than generated in most sanding operations with sandpaper or the like) releases hydrogen chloride at the grinding line which appears to have a pronounced effect upon the grinding operation, preventing or at least minimizing "loading" and assisting in the cutting action by making the metal chips more brittle.

Grinding wheels when made according to my invention achieve a number of practical advantages and the abrasive article may be made up without having to tie up expensive hot-press equipment, and several methods, illustrations of which are later set forth, may be used where it is not desired to resort to hot-pressing. Thus the mix of resin (in powder form), abrasive grains, and chloracetate hardening agent, with or without other ingredients, fillers, or the like, may be shaped in any desired way cold, or at room temperature, and after such shaping may be put in an oven for heat treatment to cure the resin and effect the bonding together of the abrasive articles. Grinding wheels made according to my invention have or may be given, in general, cutting characteristics similar to those of hard-rubber bonded wheels, and thus may be used to perform grinding operations where such hard rubber-bonded wheels are preferred or more suitable.

However, my invention consists also in the discovery that the above-mentioned esters are good solvents or hardening agents for the primary aromatic amine formaldehyde resins and that thereby I am enabled to produce a resin, with or without fillers or the like, that is strong and tough and that may be used for the making of various articles, lending itself, in its intermediate stage, to ready and facile molding, shaping or otherwise conforming it to the desired configuration, and lending itself thereafter to advantageous and economical heat treatment for curing and hardening; it is, however, to be understood that, when the mix includes abrasive grains, many unique and highly advantageous features of action and coaction, both in the process and in the abrasive article itself, are achieved. Thus, for example, the esters bring to the cross-linking with the above-mentioned polymer not only hydrogen chloride, but also do so in a manner to free hydrogen chloride at the grinding line, under the heat effect produced during grinding. Moreover, the esters are good wettants for the abrasive grains and this is of great advantage in that thereby it is made certain that each grain becomes well coated by and with the particles of the powdered resin and thus there is good assurance of achieving, during the curing, good and uniform bonding of the abrasive grains, the abrasive article having thereby substantial uniformity of strength and other characteristics throughout. The abrasive wheel, can thus be made free from localized mechanical weaknesses and its wear can be uniform.

There are hereinafter set forth several examples illustrating preferred methods of making grinding wheels according to certain aspects of my invention, but it may here be pointed out that those examples will also suffice to illustrate or indicate how I may achieve the production, by the above-mentioned esters, of a resin or resinous article.

Also, insofar as I am aware, the above-mentioned esters are new compositions of matter. These I may produce in any suitable way of which the following is illustrative, thus:

130 grams of a commercial mixture of $\alpha\beta$ and $\alpha\gamma$ glycerol dichlorhydrin is mixed with 94 grams of chloracetic acid and the mixture is heated in an open flask at about 140° C. for about 8 hours. The reaction mixture is then neutralized with sodium carbonate, washed with water and finally heated at about 100° C. at reduced pressure, say, at 20 millimeters, for about 3 hours. The product is light yellow brown in color and has a slight pleasant odor. It is a good solvent for aniline formaldehyde resin.

Example I 525 grams of #46 grit "Alundum" abrasive grain is wet with 20 cc. of the above-mentioned product which may be termed glycerol dichlorhydrin chloracetate and thereto is added, with stirring, 165 grams of a mixture, by volume, of 65% of aniline formaldehyde resin, 30% of cryolite, and 5% of soluble anhydrite, resulting in a "dry granular mix." The latter is spread in a 6" mold, where a grinding wheel is to be made, and pressed to the desired pore volume, in this instance, 15 percent. The "green" wheel is then stripped from the mold and cured in an oven. Preferably, I utilize an initial curing temperature of 95° C., gradually raising the temperature, over a period of 4 hours, to about 175° C., and then keep the temperature at 175° C. for about 2 hours, and then cool the wheel off.

Example II 525 grams of #80 grit "Alundum" abrasive grain is wet with 25 cc. of the above-mentioned mixture of esters and thereto is then added, with stirring, 165 grams of a mixture, by volume, of 65% of aniline formaldehyde resin, 30% of cryolite, and 5% of soluble anhydrite, resulting in a dry granular mix.

The latter is then worked on differential mixing rolls until formed into substantially a sheet and the sheet is then passed through calender rolls until the desired thickness is achieved, in this instance, $\frac{3}{32}$". From the resultant sheet, a 12" disk is then cut and the resultant green wheel is then heat-treated, preferably in the manner described above in Example I.

It will be understood that either of the esters or mixtures thereof may be used, following substantially the proportions of materials illustrated in the foregoing two specific examples, and whether either ester alone or the two in admixture are employed, it will be seen that, in the cross-linking with the above-mentioned polymer, the same relationships appear, including the appearance of the hydrogen chloride at the amino groups.

Wheels so made, running at a surface speed of 9500 feet per minute, when tested in grinding $\frac{3}{4}$" cold rolled steel showed an areal wheel wear of 0.043 square inch per cut when running wet and 0.075 square inch per cut when running dry.

A wheel made according to Example I was tested as a portable snagging wheel with good results; its resiliency was of such an order as to greatly facilitate manual control of the positioning or movement of the wheel and the pressure of its application and gave the wheel a free cutting and smooth action.

According to certain prior practices, difficulties are encountered during heat treatment or curing, due to the fact that swelling occurs; such swelling usually results from the formation of water and is aggravated by the conversion of water or possibly also of other constituents into vapors, under the action of the heat treatment. But according to my invention such disadvantages and defects are successfully overcome and I find that, in practicing my invention, no such swelling occurs; this is due to the fact that no water or other liquid or vapors thereof, as would cause swelling, during the heat treatment or curing, are formed.

It will be understood that either of the above-mentioned esters may be used alone or they may both be used in admixture; in any such case the cross-linking is as above set forth in connection with the mixture of both esters. In the illustrations above set forth, I have used mixtures simply because of the convenience in using commercially available already-mixed glycerol dichlorhydrins of the two types; when reacted with chloracetic acid as above described, a mixture of the two chloracetates results. The illustrations above set forth are, therefore, not to be interpreted by way of limitation.

I make no claim herein to abrasive articles or to the method of making the same, since these are claimed in my Patent No. 2,319,791 of May 25, 1943.

It will thus be seen that there has been provided by this invention, an article, a composition and a method in which the various objects hereinabove set forth together with many thoroughly practical advantages are successfully achieved. As various possible embodiments might be made of the various features of the above invention and as the art herein described might be varied in various parts, all without departing from the scope of the invention, it is to be understood that all matter hereinbefore set forth is to be interpreted as illustrative and not in a limiting sense.

I claim:

1. An intermediate product that is moldable and capable of being hardened under heat treatment comprising a mixture of a primary aromatic amine formaldehyde resin and a hardening agent therefor comprising essentially a chloracetate of glycerol dichlorhydrin.

2. A resinous product comprising a primary aromatic amine formaldehyde resin alkylated by and cross-linked with a hardening agent comprising essentially a chloracetate of glycerol dichlorhydrin.

3. A resinous product comprising a primary aromatic amine formaldehyde resin cross-linked with an alkylating agent comprising essentially the esters of chloracetic acid with glycerol $\alpha\gamma$ dichlorhydrin and glycerol $\alpha\beta$ dichlorhydrin.

4. A resinous product comprising aniline formaldehyde resin alkylated by and cross-linked with a hardening agent comprising essentially a chloracetate of glycerol dichlorhydrin.

5. The method of making a resinous product which comprises mixing a primary aromatic amine formaldehyde resin with a chloracetate of glycerol dichlorhydrin and heat treating the mixture to react the resin and said ester.

6. The method of making an intermediate product that is moldable and capable of being hardened under heat treatment which comprises mixing a primary aromatic amine formaldehyde resin with a cross-linking and alkylating agent selected from the group consisting of the chloracetic acid esters of glycerol $\alpha\gamma$ dichlorhydrin and glycerol $\alpha\beta$ dichlorhydrin and a mixture thereof.

7. The method of making a resinous product which comprises mixing a powdered primary aromatic amine formaldehyde resin with a cross-linking and alkylating agent comprising essentially a chloracetic acid ester of glycerol dichlorhydrin, cold-molding the mixture and subsequently heat treating the molded article to cause said ester to react with the resin and thereby hardening the mass.

LORING COES, Jr.